United States Patent [19]
Hahn

[11] 3,818,093
[45] June 18, 1974

[54] METHOD OF INDUCING INFERTILITY AND PREVENTING LITTERING IN THE FEMALE

[75] Inventor: Do Won Hahn, Flemington, N.J.

[73] Assignee: Ortho Pharmaceutical Corporation, Raritan, N.J.

[22] Filed: May 10, 1971

[21] Appl. No.: 142,012

[52] U.S. Cl. ............... 424/270, 424/248, 424/250, 424/267, 424/274
[51] Int. Cl. ........................................... A61k 27/00
[58] Field of Search ........................... 424/270, 267

[56] References Cited
OTHER PUBLICATIONS

Fye et al. Chem. Abst. Vol. 70 (1969) page 105, 422n.

*Primary Examiner*—Sam Rosen
*Attorney, Agent, or Firm*—Benjamin F. Lambert

[57] ABSTRACT

3,5-bis(substituted amino)-1,2,4-dithiazolium salts and their dithiobiuret intermediates are administered to female animals to inhibit ovulation and interrupt pregnancy.

4 Claims, No Drawings

METHOD OF INDUCING INFERTILITY AND PREVENTING LITTERING IN THE FEMALE

Over the past decade, a significant amount of research effort has gone into the development of compounds and regimen for the inducement of infertility in the female. Most of the regimen and compounds developed to date have a mode of action which depends upon the suppression of ovulation or the rendering of the uterine epithelium inhospitable to implantation. The compounds utilized for this purpose have generally been steroidal.

A significant amount of research effort has also been directed toward the development of compounds and regimen which can be best described as pregnancy interrupters, that is, the mode of action depends upon the lysing of the zygote prior to implantation, disruption of the uterine environment, or the resorption of implanted zygotes. Such research has concentrated on non-steroidal compounds although it is known that large doses of steroidal estrogens may cause a similar effect. To date, no pregnancy interrupter has been commercialized.

It has now been discovered that compounds of the class

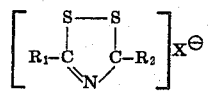

wherein X represents an anion of an acid having an ionization constant of at least $1 \times 10^{-7}$; $R_1$ is dialkyl amino; and $R_2$ is a substituted amino radical, are potent suppressors of ovulation when administered in effective but non-toxic doses to female animals on each of the 3 days immediately preceeding the anticipated ovulation. Since ovulation is not always easily predictable, in commercial practice the compound would be administered over a broader span of time.

It has also been discovered that these same compounds are active pregnancy interrupters when administered in effective but non-toxic doses to female animals, the doses varying significantly depending upon the day on which administration of the compound is initiated and the duration of administration.

The most potent and least toxic of the compounds of this series are those wherein $R_2$ is selected from the group consisting of dialkyl amino having from two to 36 carbon atoms, diaryl amino having from 12 to 20 carbon atoms, alkyl aryl amino having from seven to 12 carbon atoms, piperidino, morpholino, pyrolidino and piperozino.

It has also been found that the dithiobiurets which are isolatable intermediates in the preparation of the above-noted compounds are also active antiovulatory agents and pregnancy interrupters. It is hypothesized that either these compounds undergo cyclization to active dithiazolium salts in vivo or the dithiazolium salts undergo degradation in vivo to the corresponding dithiobiuret. The active dithiobiurets are, therefore, those of the class $$R_1-\overset{S}{\overset{\|}{C}}-NH-\overset{S}{\overset{\|}{C}}-R_2$$

wherein $R_1$ and $R_2$ are as heretofore defined.

The compounds utilized in the method of this invention are, for the most part, disclosed and claimed in U.S. Pat. No. 3,166,564 to Diveley, in which patent it is disclosed that these compounds are useful as defoliants. The compounds used in the method of this invention are thus prepared in the manner described in U.S. Pat. No. 3,166,564 and are set forth as follows, wherein $R_1$ and $R_2$ represent alkylamino-dimethylamino, diethylamino, dipropylamino, dibutylamino, dilaurylamino, didodecylamino, and dicyclohexylamino, methylstearylamino, distearylamino; diarylamino-diphenylamino, ditolylamino, tolylphenylamino, dinaphthylamino; alkylarylamino-methylphenylamino, butyltolyl-amino, cyclohexylphenylamino; heterocyclic sec-amino-piperidino and morpholino. $R_1$ and $R_2$ may be the same or different.

The precise mode of action of these compounds in the inhibition of ovulation is not clear, but it is thought that they are antigonadotrophic agents and thus suppress the pituitary in the same manner as steroidal hormone contraceptives. The mode of action of the compounds in the termination of pregnancy is also not entirely clear. The termination of pregnancy when the compound is administered early in gestation can be explained by the antigonadotrophic action of the compounds, however, the mode of action later on in gestation is as yet obscure.

The use of these compounds in the inhibition of ovulation in female animals may be demonstrated as follows:

The compound 3,5-bis(dimethyl amino)-1,2,4-dithiazolium chloride is dissolved in propylene glycol or mixed with laboratory chow and administered orally to 4 day cyclic rats for a specified number of days prior to expected ovulation. Controls received the same regimen without the active compound. The rats are sacrificed in order to determine whether or not ovulation has occurred by examining oviduct and uterine flushings for the presence of ova. The results of the study are set forth in Table I.

The use of these compounds as pregnancy interrupters is demonstrated as follows:

A female rat is mated with a male rat during the pro-estrus stage. Vaginal washings the day after mating confirms the presence of sperm. 3,5-bis(dimethyl amino)-1,2,4-dithiazolium chloride is dissolved in propylene glycol or mixed in laboratory chow and is orally administered to the female rat for a period of specified duration. At the end of this period, the female rats are sacrificed and the uteri are examined to determine the existance, or lack thereof, of implants and the condition of any such implants. The results of the study are set forth in Table II.

TABLE I

EFFECT OF 3,5-bis(dimethyl amino)-1,2,4-dithiazolium chloride OVULATION IN RATS

| Treatment Dosage (mg/kg) | Days Treated Prior To Expected Ovulation | No. Rats Ovul./Total | OVA Normal | OVA Abnormal | Total |
|---|---|---|---|---|---|
| Control (0.0) | 3 | 5/5 | 47 | 0 | 47 |
| 0.01 | 3 | 2/5 | 0 | 3 | 3 |
| 0.05 | 3 | 1/5 | 0 | 2 | 2 |
| 0.1 | 3 | 0/5 | — | — | — |

TABLE I – Continued

EFFECT OF 3,5-bis(dimethyl amino)-1,2,4-dithiazolium chloride OVULATION IN RATS

| Treatment Dosage (mg/kg) | Days Treated Prior To Expected Ovulation | No. Rats Ovul./Total | OVA Normal | Abnormal | Total |
|---|---|---|---|---|---|
| 1.0 | 3 | 0/5 | — | — | — |
| Control (0.0) | 2 | 2/2 | 22 | 0 | 22 |
| 0.1 | 2 | 2/5 | 13 | 0 | 13 |
| 0.5 | 2 | 2/5 | 19 | 3 | 22 |
| 1.0 | 2 | 1/5 | 16 | 0 | 16 |
| 2.5 | 2 | 4/5 | 29 | 18 | 47 |
| 5.0 | 2 | 5/5 | 39 | 1 | 40 |
| 10.0 | 2 | 4/5 | 32 | 0 | 32 |

TABLE II

EFFECT OF 3,5-bis(dimethyl amino)-1,2,4-dithiazolium chloride IN THE RAT DURING GESTATION

| Treatment Dose (mg/kg) | Treatment Days | No. Rats Preg/Total | No. Implants Normal | Resorbed | Total |
|---|---|---|---|---|---|
| Vehicle (0.0) | 1–6 | 5/5 | 57 | 1 | 58 |
| 5 | 1–6 | 3/5 | 14 29* | 0 | 43 |
| 20 | 1–6 | 0/5 | — | — | — |
| 5 | 7–10 | 5/5 | 23 | 30 | 53 |
| 20 | 7–10 | 0/5 | — | — | — |
| 1 | 10–13 | 4/5 | 16 | 37 | 53 |
| 5 | 10–13 | 4/5 | 0 | 40 | 40 |
| 20 | 10–13 | 4/5 | 0 | 54 | 54 |
| 5 | 13–16 | 5/5 | 0 | 63 | 63 |
| 10 | 13–16 | 5/5 | 0 | 62 | 62 |
| 20 | 13–16 | 4/5 | 0 | 58 | 58 |
| 20 | 16–19 | 4/4 | 0 | 54 | 54 |
| 0.1 | 1–13 | 4/5 | 42* | 5 | 47 |
| 0.1 | 1–13 | 4/5** | | | |
| 0.1 | 1–20 | 4/5 | 34*** | 1 | 35 |

*Fetuses approximately 5–7 days smaller than normal.
**Laparotomy at day 8 resulted in 4/5 with normal implants; Laparotomy at day 15 resulted in 1/3 with normal implants; One rat died and one with resorbed implants.
***Delivered 34 normal pups.

The specific dose and regimen utilized to inhibit ovulation or prevent littering will depend on the species and specific compound chosen, however, an effective dose for a particular species and compound can be rapidly determined by routine clinical and laboratory screens.

What is claimed is:

1. A method of inhibiting ovulation in female animals comprising orally administering to a female animal, for at least 3 days prior to ovulation, non-toxic ovulation inhibiting doses of adithiazolium compound of the formula

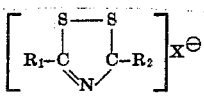

wherein X represents an anion of a pharmaceutically acceptable acid having an ionization constant of at least $1 \times 10^{-7}$, and $R_1$ is dialkyl amino and $R_2$ is selected from dialkyl amino having from two to 36 carbon atoms, diaryl amino having from 12 to 20 carbon atoms, alkyl aryl amino having from seven to 12 carbon atoms, piperidino or pyrrolidino whereby ovulation is inhibited.

2. The method of claim 1 wherein said compound is 3,5-bis(dimethylamino)-1,2,4-dithiazolium chloride.

3. A method of preventing littering in female animals comprising orally administering to a female animal post coitally non-toxic, effective antilittering doses of a dithiazolium compound of the formula

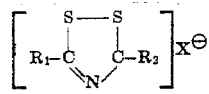

wherein X represents an anion of a pharmaceutically acceptable acid having an ionization constant of at least $1 \times 10^{-7}$, and $R_1$ is dialkyl amino and $R_2$ is selected from dialkyl amino having from two to 36 carbon atoms, diaryl amino having from 12 to 20 carbon atoms, alkyl aryl amino having from seven to 12 carbon atoms, piperidino or pyrrolidino whereby littering is prevented.

4. The method according to claim 3 wherein said compound is 3,5-bis(dimethylamino)-(dimethylamino) 1,2,4-dithiazolium chloride.

* * * * *

PO-1050
(5/69)

UNITED STATES PATENT OFFICE
CERTIFICATE OF CORRECTION

Patent No. 3,818,093      Dated June 18, 1974

Inventor(s) Do Won Hahn

It is certified that error appears in the above-identified patent and that said Letters Patent are hereby corrected as shown below:

In Column 1, line 28, "C-$R_2$" should read -- "C=$R_2$" --.

In Column 1, lines 58 & 59, "in vivo" should be in italics " --.

In Column 3, line 52, " C-$R_2$" should read -- "C=$R_2$" --.

In Column 4, line 47, "C-$R_2$" should read -- "C=$R_2$" --.

In Column 4, line 60, "3,5-bis(dimethylamino)-(dimethylamino)-1,2,4-dithiazolium chloride" should read -- "3,5-bis(dimethylamino)-1,2,4-dithiazolium chloride" --.

Signed and sealed this 29th day of October 1974.

(SEAL)
Attest:

McCOY M. GIBSON JR.
Attesting Officer

C. MARSHALL DANN
Commissioner of Patents